Aug. 22, 1933.   A. T. ABRAM   1,923,249
AEROPLANE
Filed Aug. 8, 1932   4 Sheets-Sheet 2
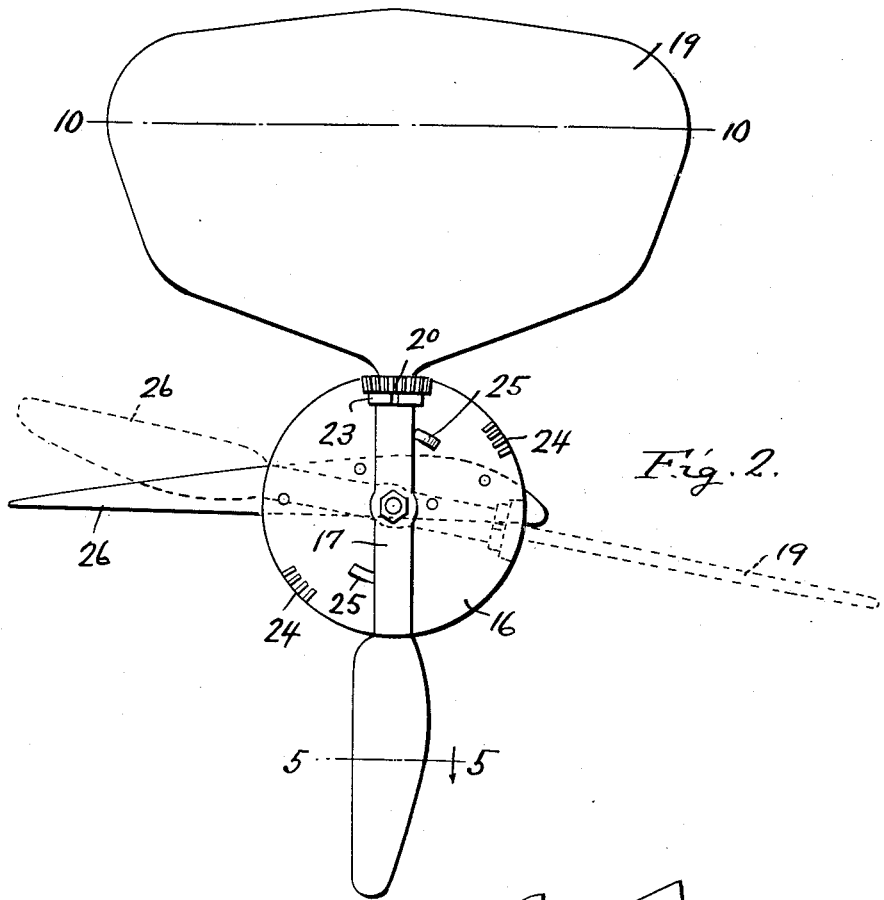
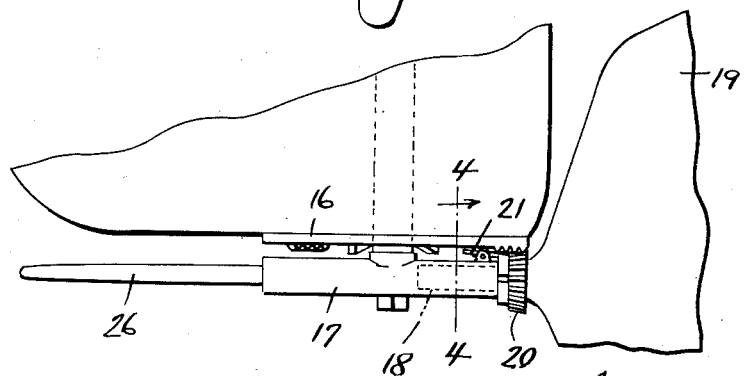
Inventor
Augustus T. Abram
By Clarence A. O'Brien
Attorney

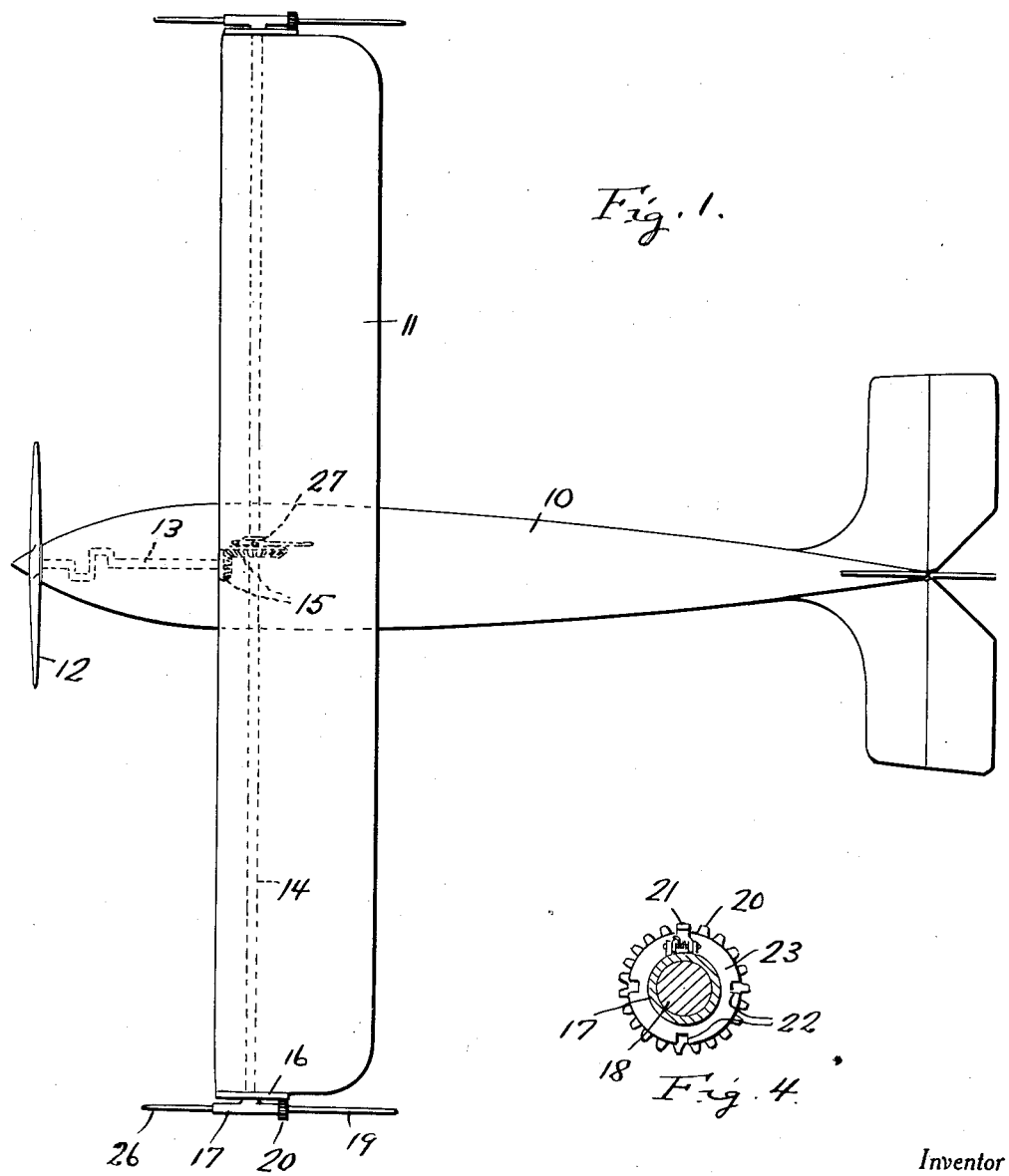

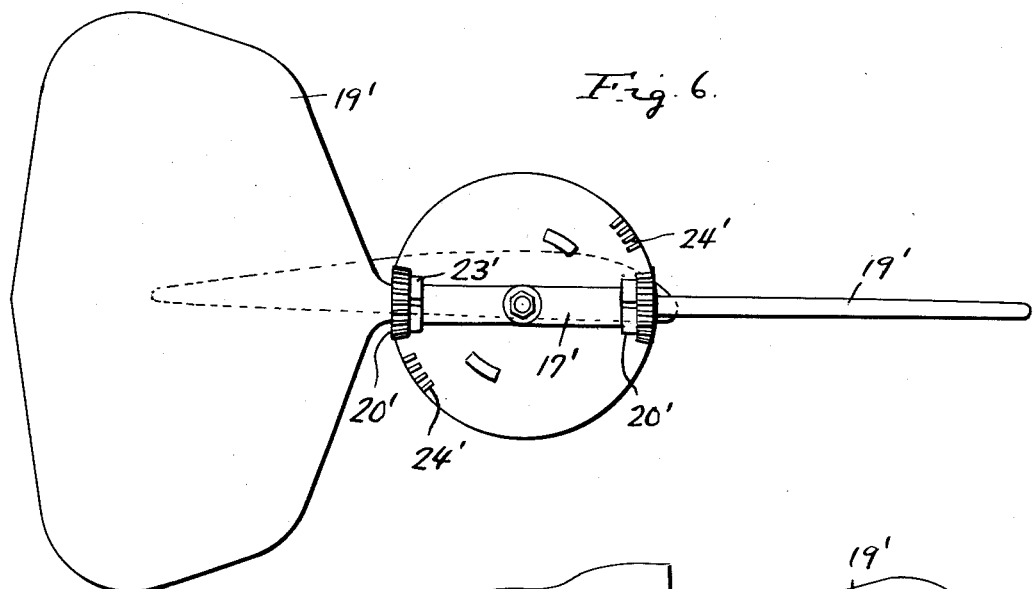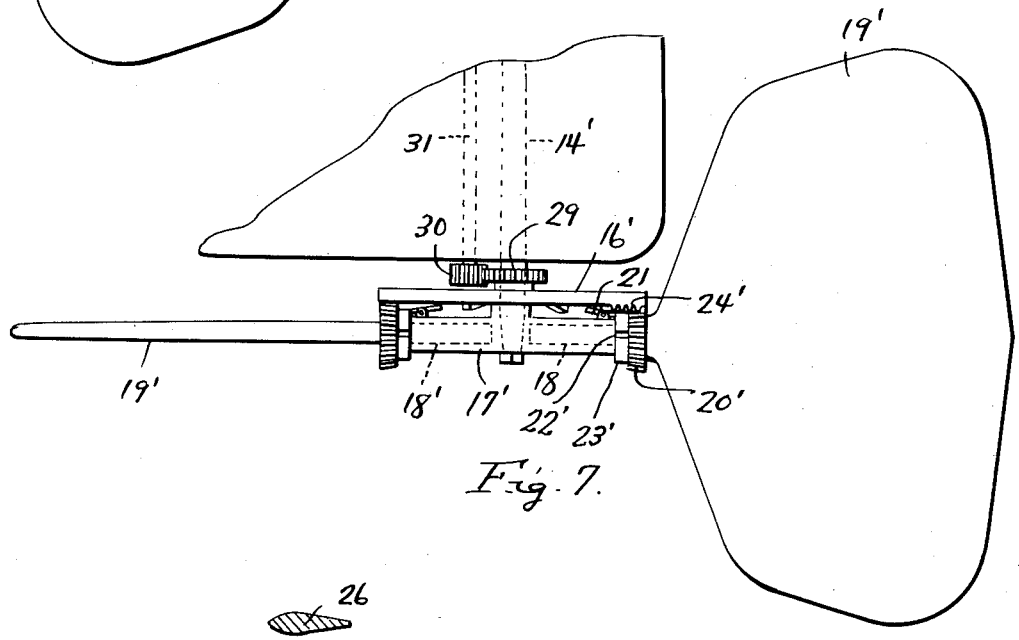

Aug. 22, 1933.  A. T. ABRAM  1,923,249
AEROPLANE
Filed Aug. 8, 1932  4 Sheets-Sheet 4

Inventor
Augustus T. Abram
By Clarence A. O'Brien
Attorney

Patented Aug. 22, 1933

1,923,249

UNITED STATES PATENT OFFICE 1,923,249

AEROPLANE

Augustus T. Abram, Bronx, N. Y.

Application August 8, 1932. Serial No. 627,978

4 Claims. (Cl. 244—16)

This invention relates broadly to aeroplanes and more particularly to control means therefor.

In accordance with the present invention means is provided for use on an aircraft to permit the pilot to land at a relatively low rate of speed and within a comparatively small or restricted area; and also to assist in the "taking off" of the aeroplane.

Briefly the invention consists in the provision of airfoils of novel construction which may be so arranged on an aeroplane and so manipulated for controlling the aeroplane as to enable the pilot to land the aircraft at a relatively low speed within a restricted area. The invention also will be found to be a great aid toward the accomplishment of a proper "take off" of the aeroplane.

The invention together with its numerous objects and advantages will be best understood from the following description, taken in connection with the accompanying drawings wherein:

Figure 1 is a plan view of an aeroplane having my airfoils mounted thereon.

Figure 2 is a side elevational view of an airfoil, one position of the same being suggested in full line and the other in dotted line.

Figure 3 is a fragmentary top plan view of the airfoil the same being shown mounted on the aeroplane.

Figure 4 is a sectional view taken substantially on the line 4—4 of Figure 3.

Figure 5 is a sectional view taken substantially on the line 5—5 of Figure 2.

Figure 6 is a side elevational view of a slightly modified form of the invention.

Figure 7 is a top plan view of the form of the invention shown in Figure 6.

Figure 10 is a transverse sectional view taken on the line 10—10 of Figure 2.

Figure 8:
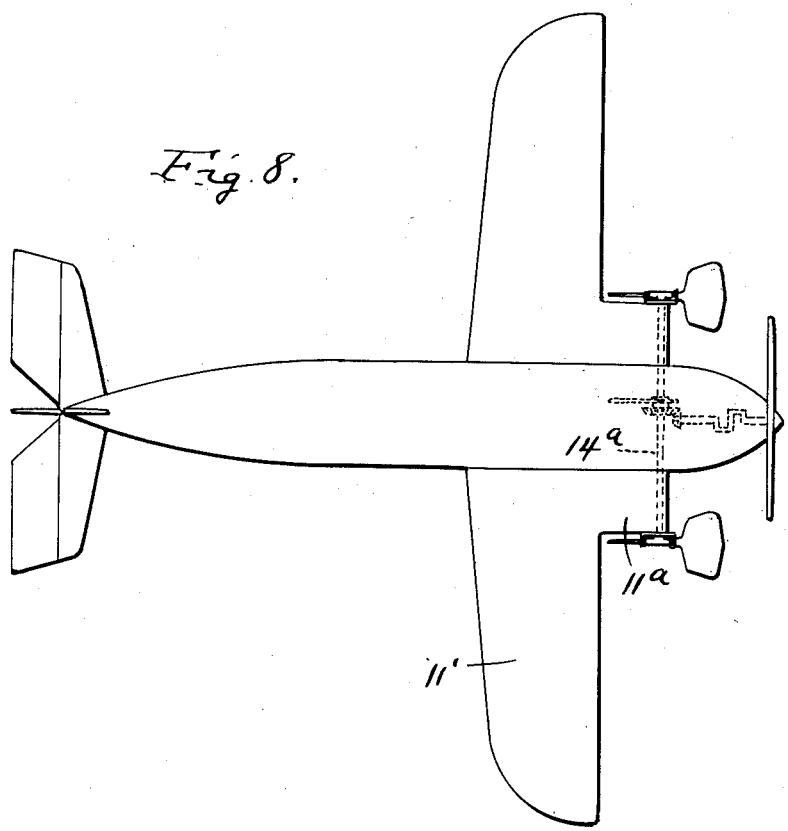
Figure 8 is a plan view of still another form of the invention.

With reference more in detail to the drawings it will be seen that my invention is applicable to a conventional type of aeroplane and in the present instance such an aeroplane is illustrated, the same including among other parts a fuselage 10 sustaining plane or wing 11, a propeller 12, and cam shaft 13 for driving the propeller 12.

Reference being had to Figures 1 to 6 inclusive it will be seen that in this form of the invention there is suitably mounted on the sustaining plane or wing 11 a driven shaft 14 projecting at its end beyond the corresponding ends of the wing 11, and intermediate its ends geared to the shaft 13 as at 15.

Fixedly mounted on each end of the sustaining flange or wing 11 is a circular plate or disk 16, and each of the disks 16 is provided with a central aperture through which an end of the shaft 14 extends. On each end of the shaft 14 is a cross head 17 that is provided at one end with a socket rotatably receiving the shank 18 of my improved airfoil designated generally by the reference character 19. The airfoil 19 is formed of light weight of durable material and is of the shape generally suggested in the drawings, being somewhat fan shaped as noted.

As shown in Figure 8 the airfoil 19 is thickened as at 19a along its marginal edge and the faces of the airfoil slope inwardly from the thickened marginal edge portion 19a toward the center of the airfoil.

Fixed on the shank 18 of the airfoil is a gear wheel 20, and the shank 18 is normally held against rotation relative to the cross head 17 through the medium of a spring pressed locking element or dog 21 pivotally mounted on the cross head 17 and having an end engageable with a selected one of a series of relatively spaced notches 22 provided on the periphery of a hub extension 23 of the gear 20.

A disk or plate 16 is provided on the outer face with two diametrically opposite series of teeth 24, and inwardly from the peripheral edge thereof and in proximity to the teeth 24 with oppositely beveled cam lugs 25.

On its free end cross head 17 is provided with a balancing weight 26, and the weight 26 as shown in Figure 5 is in cross section of airfoil shape. From the description of the invention thus far it will be seen that when the shaft 13 drives propeller 12, shaft 14 will through the medium of the gearing 16 be driven into the shaft 13 thus causing the airfoils 19 to rotate in a clockwise direction. As the gear 20 approaches each series of teeth 24 on the plate 16 the latch member 21 will first engage the cam 25 with the result that substantially as soon as the gear 20 meshes with the referred to series of teeth 24 the latch member 21 is rocked about its pivot, and moves out of engagement with a notch 22 whereupon the shank 18 will be free to rotate. Manifestly as the shaft 14 is to rotate gear 20 meshes with the aforementioned series of teeth 24 will cause the shank 18 to rotate thus varying the angle or pitch of the airfoil 19. In this connection it is to be noted that the series of teeth 24 are so spaced relative to one another that the pitch of the airfoil 19 will be varied at substantially the completion of a half revolution of a cross head 17, while the teeth 24 of each series are of such a number that the shank 18 of the airfoil will only be rotated about one quarter of a revolution. It will be also further noted that the series of teeth 24 are so arranged that the pitch of the airfoil will be changed only when the cross head 17 is at an angle to the perpendicular.

For controlling the transmission of power from the shaft 14 to the shaft 15 there is provided a suitable mechanism 27.

In actual practice and during flight each cross head 17 is in a vertical position and the airfoils 9 are disposed upwardly with their faces paralleling the line of flight so as to offer little or no resistance. Further the clutch 27 is released so that there is no transmission power to the shaft 14.

For applying a braking action to the aircraft, as might be desired for slowing the speed of the aircraft when landing, clutch 27 is "thrown in" whereby drive from shaft 13 is transmitted to shaft 14 causing the cross heads 17 to rotate in a clockwise direction. Obviously as the cross heads rotate in a clockwise direction the gears 20 will be brought into mesh with a series of teeth 24 on each plate resulting, in a manner, above described, in a rotation of the airfoils 19 so that the faces of the airfoil are disposed at a slight angle to the line of flight thus serving to slightly retard the speed of the aeroplane. As the shaft 14 continues to rotate the gears 20 pass into mesh with the second series of teeth 24 whereupon the airfoils 19 are further rotated so that their faces are disposed at right angles to the line of flight, and the airfoils in this last named position obviously serve to further decrease the speed of the aeroplane.

In the form of the invention shown in Figures 6 to 9 inclusive instead of providing each cross head with an airfoil and a balance weight each cross head is provided with two airfoils 19' arranged substantially with their faces at right angles to one another. Also each cross head 17' is provided at each end with a socket for receiving a shank 18' of an airfoil.

Also each shank 18' is provided with a gear 20' for mesh with the teeth of the series 24' of teeth on an adjacent plate 16'. Each gear 20' is also provided with a notched collar or hub extension 23' having notches 22' with which is engageable a pivoted latch member 21' provided on an adjacent end of the cross head.

The form of the invention just described will be found especially useful for assisting the aeroplane when "taking off".

In the form of the invention shown in Figure 7 the plates 16' are mounted on the shaft 14' for rotation relative thereto, and each plate is provided with a hub carrying a gear wheel 29 with which pinions 30 are in constant mesh. Pinions 30 are provided on the end of a shaft 31 paralleling the shaft 14', and any suitable manual means (not shown) may be employed for rotating the shaft 31. In this form of the invention it will be seen that the plate 16' may be angularly adjusted when desired by rotating the shaft 31, the motion of the shaft 31 being transmitted to the plate 16' through the medium of the gearing 29, 30.

In this last named form of the invention plates 16' can be readily rotated in a clockwise direction a desired fraction of a revolution sufficient to so position the teeth on the plates that the gear wheels 20' will mesh with the teeth 24' when the cross heads 17 are in substantially horizontal position, with the result the airfoils 19 being in the position suggested in Figure 7 will materially assist in the forward propulsion of the aircraft, increasing the speed of the aircraft.

In Figures 1 to 7 inclusive I have shown the shafts 14, 14' as extended longitudinally of the sustaining wing of the aeroplane for the full length of the sustaining wing. In Figure 8, I have shown a slightly modified form of sustaining wing, the same being designated by the reference character 11'. In this form of the invention the wing 11' at its leading edge and inwardly from the ends thereof, and in proximity to the fuselage of the aeroplane is projected forwardly as at 11a and the cross head equipped shaft corresponding to the shaft 14 in Figure 1 and the shaft 14' in Figure 7 is supported in the extension 11a, and the said shaft, in Figure 8 being designated by the reference character 14a is relatively shorter than shafts 14, 14' with the result that the airfoils are disposed inwardly a considerable distance from the end of the sustaining plane or wing.

Figure 9:
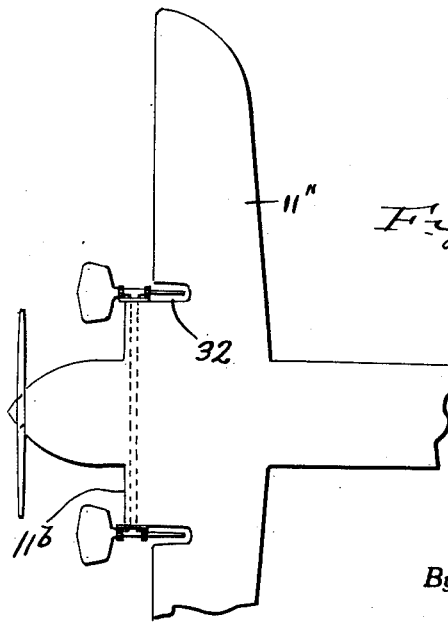
Figure 9 is a fragmentary plan view of yet another form of the invention.

In the form of the invention shown in Figure 9 the projection 11b does not project forwardly as far as the projection 11a in Figure 8 and to compensate for lift, the sustaining wing 11" adjacent the projection 11b is notched in a suitable manner and as indicated at 32 so as not to interfere with the operation of the airfoil.

Even though I have herein shown and described the preferred embodiment of the invention, it is to be understood that the same is susceptible of further changes, modifications and improvements coming within the scope of the appended claims.

Having thus described my invention, what I claim as new is:

1. In an aeroplane, a laterally disposed plate mounted on said aeroplane, and provided with diametrically opposite series of gear teeth, a member rotatable on an axis concentric to said plate, said member being also provided with a socket, an airfoil member comprising a shank rotatably mounted in said socket, a broad flat fan-shaped head on one end of said shank, and a gear on said shank adapted to mesh with each series of gear teeth for rotating said shank at predetermined points in the rotation of said member.

2. In an aeroplane, a laterally disposed plate mounted on said aeroplane, and provided with diametrically opposite series of gear teeth, a member rotatable on an axis concentric to said plate, said member being also provided with a socket, an airfoil member comprising a shank rotatably mounted in said socket, a broad flat fan-shaped head on one end of said shank, a gear on said shank adapted to mesh with each series of gear teeth for rotating said shank at predetermined points in the rotation of said member, interengaging means on said shank and said member for normally retaining the shank against rotation, and means on said plate for releasing said interengaging means each time said gear approaches a series of gear teeth on said plate.

3. In an aeroplane, a plate provided adjacent its peripheral edge and on one face with an arcuate series of gear teeth, a member rotatable on an axis concentric to said plate, an airfoil rotatably mounted on said member, a gear on said airfoil adapted to mesh with said gear teeth for rotating said airfoil, interengaging means on said member and said airfoil for releasably retaining the airfoil against rotation relative to said member, and including a pivoted latch, and means on said plate for engaging said latch to release said inter-engaging means each time said airfoil approaches said gear teeth.

4. In an aeroplane, a rotatably mounted plate, means for rotating the plate and for securing it at the desired angular adjustment, and airfoil supporting member rotatable about an axis concentric to said plate, an airfoil rotatably carried by said member, inter-engaging means on said airfoil and said plate for rotating the airfoil, interengaging means on said member and on said airfoil for releasably retaining the airfoil against rotation relative to said member, and including a pivoted latch, and means on said plate engageable with the latch for releasing it.

AUGUSTUS T. ABRAM.